(12) United States Patent
Kim et al.

(10) Patent No.: US 6,381,176 B1
(45) Date of Patent: Apr. 30, 2002

(54) METHOD OF DRIVING REMAPPING IN FLASH MEMORY AND FLASH MEMORY ARCHITECTURE SUITABLE THEREFOR

(75) Inventors: Bum-soo Kim, Anyang; Gui-young Lee, Seoul, both of (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/854,920

(22) Filed: May 15, 2001

(30) Foreign Application Priority Data

Oct. 11, 2000 (KR) .............................................. 00-59731

(51) Int. Cl.[7] .............................................. G11C 16/04
(52) U.S. Cl. ............................... 365/185.11; 365/185.33
(58) Field of Search ....................... 365/185.11, 185.33, 365/185.23

(56) References Cited

U.S. PATENT DOCUMENTS 6,034,891 A * 3/2000 Norman ................. 365/185.11
6,230,233 B1 * 5/2001 Lofgren et al. ........ 365/185.33

* cited by examiner

Primary Examiner—Huan Hoang
(74) Attorney, Agent, or Firm—Sughrue Mion, PLLC

(57) ABSTRACT

A method of driving remapping in a flash memory, which is capable of writing the status of a block and a unit by reducing the number of partial write cycles as much as possible, and a flash memory architecture adapted thereto are provided. The remapping driving method includes searching for a predetermined physical unit based on mapping information about a predetermined block, searching the found physical unit for another block, the status of which is free, if the predetermined block exists in a valid state in the physical unit; changing the status of the other block into a status next to the status of the predetermined block, writing new data and additional information such as a logical block number to the other block, and changing the status of the predetermined block to a deleted state. Accordingly, the write status of a block or a unit can be managed for a flash memory having a restriction on the number of partial write cycles.

12 Claims, 8 Drawing Sheets

LOGICAL BLOCK NUMBER-TO-
LOGICAL UNIT NUMBER
MAPPING TABLE

PUN 1

LOGICAL UNIT NUMBER-TO-
PHYSICAL UNIT NUMBER
MAPPING TABLE

PUN 2

METHOD OF DRIVING REMAPPING IN FLASH MEMORY AND FLASH MEMORY ARCHITECTURE SUITABLE THEREFOR

BACKGROUND OF THE INVENTION

1. Field of the Invention

The present invention relates to a method of writing/reading data to/from a flash memory in blocks and, and more particularly, to a method of driving logical address-to-physical address remapping when reading/writing data from/to a flash memory having a restriction on the number of partial write cycles, and a flash memory architecture suitable therefor.

2. Description of the Related Art

Like other storage devices such as conventional random access memories (RAMs), non-volatile storage devices and magnetic disks, flash memories can arbitrarily access data that are stored at specific positions. The principle difference is how data can be rewritten and erased. That is, if data is to be rewritten or erased after having been written to a block of a flash memory, which is partitioned into blocks of a predetermined size for block-based access, a unit containing the block must be rewritten or erased. A block in a flash memory is composed of bytes having contiguous physical addresses. This block is a basic unit of a flash memory. A unit is composed of a plurality of blocks and is a basic unit for which data can be physically erased and rewritten at a time.

Due to the rewrite or erase characteristics of the flash memory, as the number of erase cycles increases, write and update efficiency of data is degraded. Furthermore, when performing a rewrite/erase operation on the flash memory, data may be damaged by a failure. To prevent damage to data, a block (or sector) remapping technique has been employed.

This remapping technique manages mapping information between a logical block number (abbreviated as "LBN") and a physical block number (abbreviated as "PBN") for data written to a flash memory so that, when rewriting or erasing the corresponding data, the data may be accessed with the same LBN even if the PBN of the data is changed.

According to conventional remapping techniques, if data is to be rewritten, first, a unit containing the PBN of the data on a flash memory is searched for a physical block, to which data is not written, and then the data is written to the physical block. Mapping information between LBN and PBN of the data is updated. Thus, a user can access the corresponding data using the same LBN even if the PBN of the data is changed. In this case, erasure is indicated on status information relating to the previous physical block for the data.

For example, when data is written to units having physical unit number (PUN) 1 and PUN2 on a flash memory as shown in FIG. 1, if the user desires to rewrite data written to a block whose LBN is '3', PUN 1 is changed as shown in FIG. 2. That is, referring to an LBN-to-logical unit number (LUN) mapping table, LBN '3' corresponds to LUN '2'. Then, referring to a LUN-to-PUN mapping table, LUN '2' corresponds to PUN '1'. Thus, PUN 1, which is a unit whose PUN is "1", is searched for an empty physical block. As seen from FIG. 1, physical block # 4 (PBN 4) is found as the empty one. The data relative to LBN '3' is written to the PBN 4, and then mapping information of a block allocation map (BAM) for PUN 1 is updated. Then, erasure is indicated as status information about PBN 1 in the BAM for PUN 1. However, in this case, as the number of unused physical blocks in a physical unit increases, the utilization efficiency of a flash memory decreases.

To solve this problem, according to conventional remapping techniques, as shown in FIG. 3, first, only used blocks in PUN1 are transferred to another unit PUN 2. Then, the corresponding PUN is converted to the PUN of the other unit, that is, from PUN1 to PUN2. As a result, even if data is transferred to the other unit, the data can be accessed using the same LUN.

This conventional remapping technique does not permit an actual erase operation, as long as an empty block or an empty unit exists in a unit or the flash memory, respectively. However, since an increased number of erased blocks increases the unusable area in the flash memory, a method of reusing portions where erased blocks exist may be required.

Furthermore, in the event of a system failure such as power cut-off during a write operation or unit reuse operation, user data or data used for remapping may be damaged. Thus, to protect data from such a failure, a conventional method involves writing status information to a corresponding block or unit and appropriately modifying the written status information during an operation, thereby performing a recovery operation.

As described above, the conventional remapping technique involves performing a partial write operation numerous times in order to store and manage mapping information as well as data. Thus, it is difficult to apply the conventional remapping technique to a flash memory such as a NAND-type flash memory as it is. This is because the number of partial write cycles or the number of program cycles within the same page is limited to five or three in the case of a NAND-type flash memory. Thus, information written to a block or unit cannot be revised many times. For example, in the event of a system failure, a recovery operation may not be normally performed because the amount of revision of status information written to a corresponding block or unit is limited as described above.

Furthermore, in order to indicate the status of a predetermined block in a process such as free (FF)→allocated (8F)→being written (4F)→written (2F)→being erasing (0F)→erased (00), or to indicate the status of a predetermined unit in a process such as free (FF)→being copied (8F)→valid (4F)→being transferred (2F), a write operation is performed on the same physical position at least three or five times. In addition, considering that a path of user data or error correction code (ECC) is written to a unit or a block, it is difficult to apply the conventional remapping to a flash memory in which the number of partial write cycles is limited to three or five.

SUMMARY OF THE INVENTION

To solve the above problems, it is an objective of the present invention to provide a method of driving remapping in a flash memory, by which the status of a block and a unit can be written and handled while keeping the number of partial write cycles to a minimum, and a flash memory architecture adapted thereto.

It is another objective of the present invention to provide a method of driving remapping in a flash memory that indicates status information relating to a block and a unit with a smaller number of partial write cycles using a wrap-count, and a flash memory architecture adapted thereto.

It is still another objective of the present invention to provide a method of driving remapping suitable for a NAND-type flash memory, and a flash memory architecture adapted thereto.

Accordingly, to achieve the above objectives, the present invention provides a method of driving remapping in a flash memory which is partitioned into a plurality of units, each unit having one or more blocks. The method includes searching for a predetermined physical unit based on mapping information about a predetermined block, searching the found physical unit for another block if the predetermined block exists in a valid state in the physical unit, the status of which is free, changing the status of the other block into a status next to the status of the predetermined block, writing new data and additional information such as a logical block number to the other block, and changing the status of the predetermined block into a deleted state.

Preferably, the method further includes, when the predetermined block does not exist or exists in a deleted state, setting the status of the predetermined block to free and searching for another block whose status is free and, when the other block does not exist, performing a reclaim operation on the physical unit.

Preferably, performing a reclaim operation includes determining a source unit to be reclaimed and a transfer unit, setting the statuses of the source unit and the transfer unit to being transferred and being copied, respectively, copying valid blocks and related meta information and header information within the source unit, setting the transfer unit, the status of which has been set as being copied, to a valid state, while increasing the number of erase cycles (wear level) of the source unit, and deleting the source unit while writing the number of erase cycles to the source unit.

According to the present invention, a flash memory is preferably constructed such that a first block of the unit is allocated so as to write information including a logical unit number, validity of a status, and the number of erase cycles for a previous block, a second block of the unit is allocated so as to write information including the status of copying/transferring and the number of erase cycles (wear level), and information indicating the status of a block determined based on a wrap-count is written at a predetermined area of a spare array in a block, to which data of the unit is written.

BRIEF DESCRIPTION OF THE DRAWINGS

The above objectives and advantages of the present invention will become more apparent by describing in detail a preferred embodiment thereof with reference to the attached drawings in which.

DETAILED DESCRIPTION OF THE INVENTION

Figure 1:
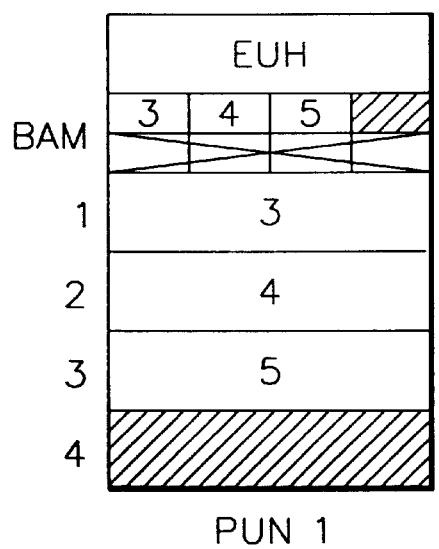
FIG. 1 shows an example of the relationship between a block and a unit in a flash memory and a conventional remapping driving method.
Figure 1:
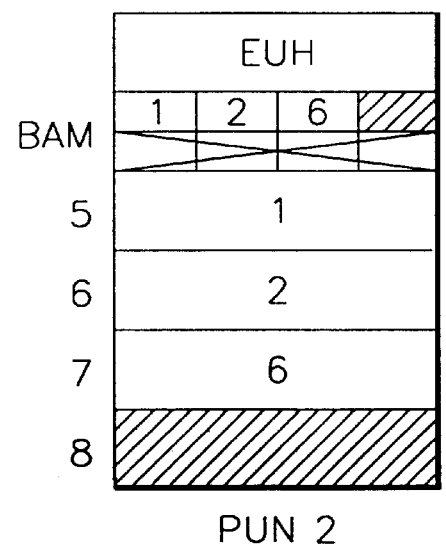
Figure 2:
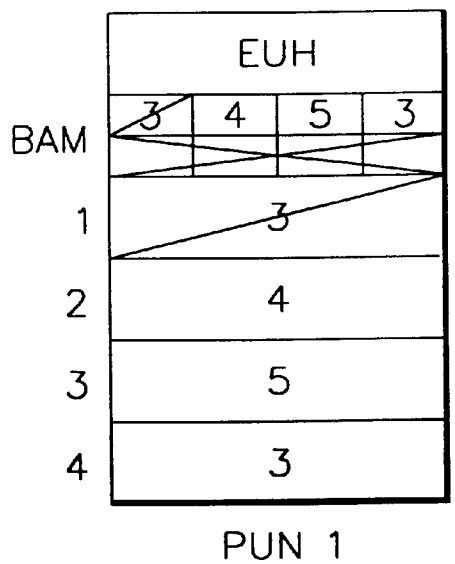
FIG. 2 shows an example of the relationship between a block and a unit in the flash memory and the conventional remapping driving method when erasing a block of the flash memory, to which data has been written as shown in FIG. 1.
Figure 2:
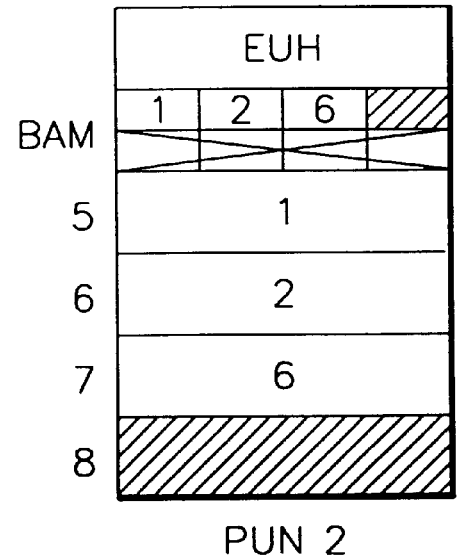
Figure 3:
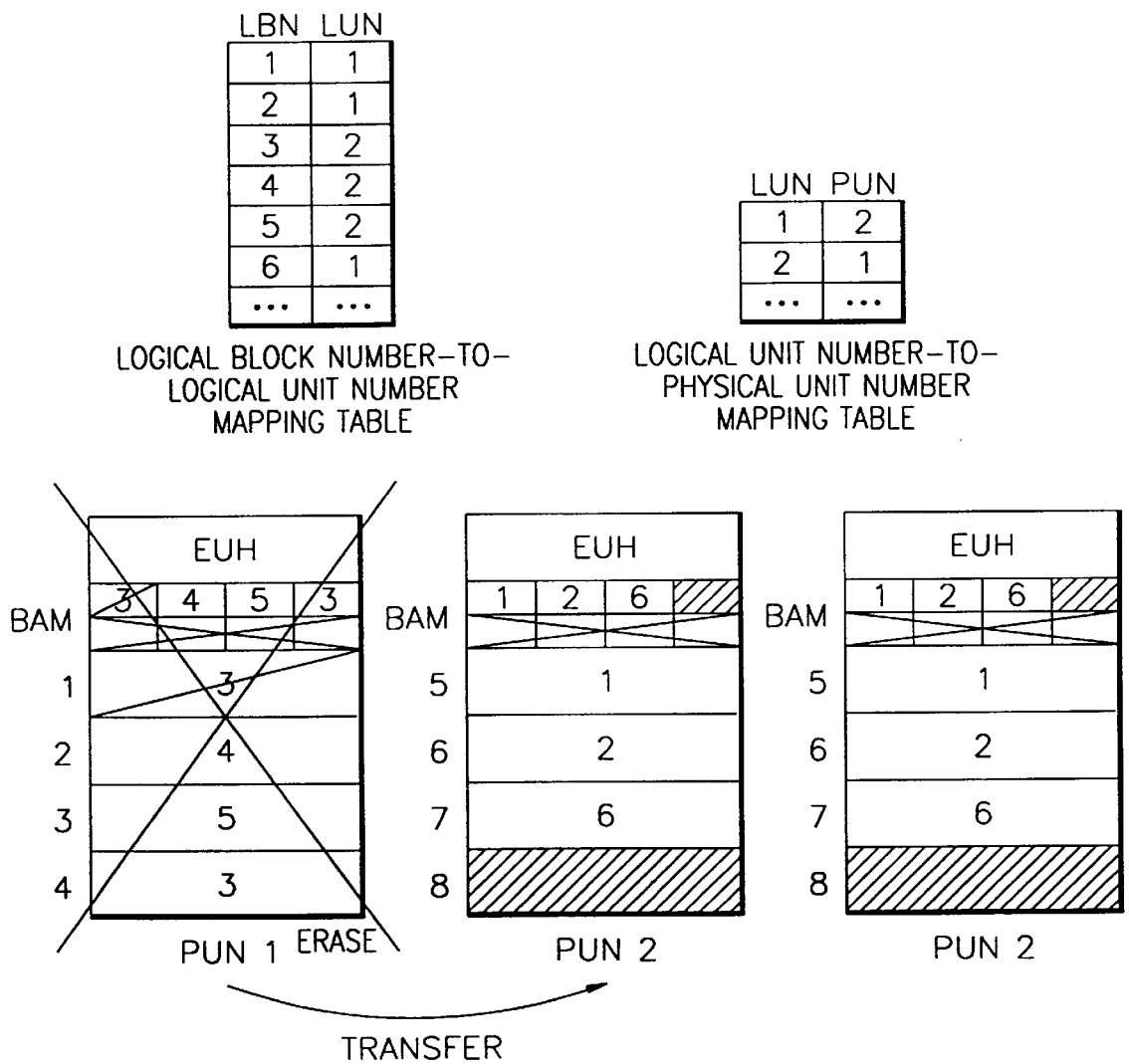
FIG. 3 shows an example of the relationship between a block and a unit in the flash memory and the conventional remapping driving method when erasing a unit of the flash memory, to which data is written as shown in FIG. 2.

First, an erase unit is used as a basic unit of erasure in a remapping method for flash memory. The erase unit may be the same as a physical erasure block of a flash memory such as the physical unit number (PUN) 1 or PUN 2 shown in FIGS. 1–3 or may be composed of a plurality of erasure blocks. A PUN and a logical unit number (LUN) are assigned to each erase unit. A PUN is assigned based on the physical order of an erase unit, while a LUN indicates the logical order of a unit. When a flash memory is initially used, a table indicating a LUN-to-PUN mapping as shown in FIGS. 1–3 is provided on the flash memory or on a separate memory. This table changes each time the mapping relationship of the flash memory changes due to operations such as erase, rewrite, and reproduce.

The erase unit is partitioned into blocks (or sectors) as shown in the PUN 1 and the PUN 2 of FIGS. 1–3. These blocks of equal size are the basic units of operation for flash memory. Furthermore, the erase unit includes an erase unit header (EUH) and a block allocation map (BAM).

Information about the whole flash memory and information required for management of a corresponding erase unit are written in the EUH of the erase unit. The information about the whole flash memory may include indications of the size of the blocks in the erase unit and a bad block map. The information necessary for unit management may include a LUN, and a wear level. The erase unit header can take up one or more blocks.

Following the EUH, user data and the BAM are written as shown in the PUN1 and the PUN2 of FIGS. 1–3. The BAM may be collectively written to one or more blocks or may be written in a particular space such as a spare array of a NAND-type flash memory on a block-by-block basis.

Information about the blocks in the erase unit such as a logical block number (LBN) and a block status is written in the BAM. A LBN is the address of a block from the viewpoint of the user. Thus, the BAM represents mapping between a LBN and a physical location at which the corresponding block is actually written. When data written to a block is changed, the content of the BAM such as LBN-to-PBN mapping information and status information is also changed.

As the number of blocks, the statuses of which are changed, increases, unusable portions of the flash memory increase. Thus, a reclaim operation is appropriately performed so as to reuse spaces occupied by an erase block. A conventional remapping driving method considers this point, but does not specify how the above reclaim operation is performed for a flash memory such as a NAND-type flash memory having a restriction on the number of partial write cycles.

Thus, the present invention proposes a method of indicating status information about a particular block using a wrap-count. This method makes it possible to modify the status of the particular block with a smaller number of partial writes and to recover data of the particular block in the event of a system failure. Furthermore, since the previous data and new data can be distinguished from each other by using the changing order of a wrap-count, various recovery methods such as roll-back and roll-forward processes may be used. The roll-back process is to recover data with new data, while the roll-forward process is to recover data with previous data. As described above, a remapping driving operation of the flash memory is divided into three main operations: block writing, empty block search, and recovery from failure.

The status of each block in the BAM is indicated as 'free', 'valid', or 'deleted'. The 'valid' status may be divided into three states, s0, s1, and s2, for example. There is a circular relationship between three states in a valid state. For example, s0<s1, s1<s2, and s2<s0. The valid status is changed in this order, which is called a wrap-count. That is, a particular block is initially in a free state and when first recording data, the status of the particular block is s0. When recording data again, the status of the block is changed in the order s1, s2, s0.

Figure 4:
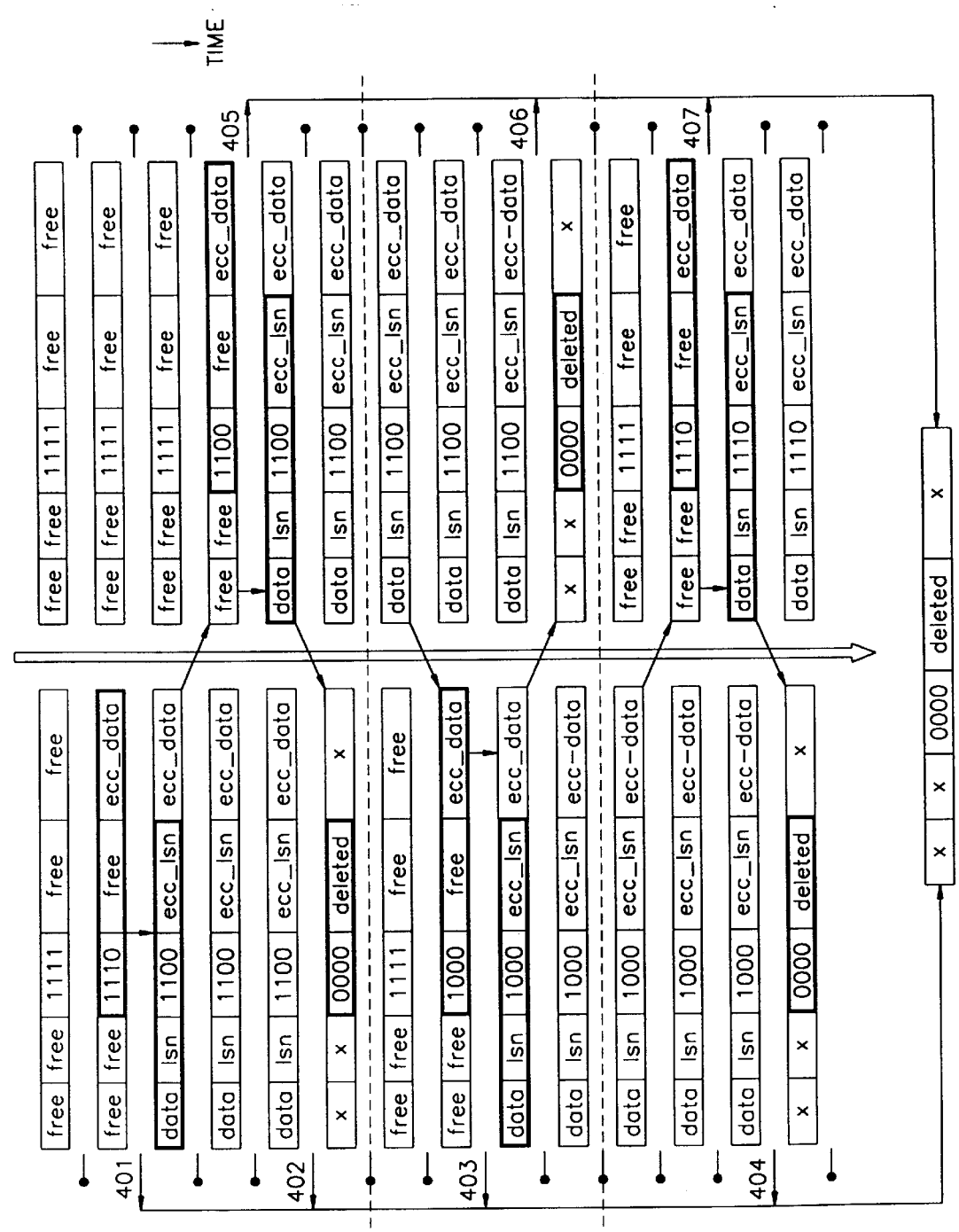
FIG. 4 shows an example of the relationship between blocks for explaining write and rewrite operations performed by a remapping driving method for a flash memory according to the present invention.

FIG. 4 shows a process of writing data to a predetermined block using the abovementioned status information. FIG. 4 is an example in which 'free', 's0', 's1', 's2', and 'deleted'are set as '1111', '1110', '1100', '1000', and '0000'. Thus, the status of the block is given by five values which circulate. FIG. 4 is an example in which a NAND-type flash memory composed of physical units (PUs) as shown in FIG. 5 is used.

Figure 5:
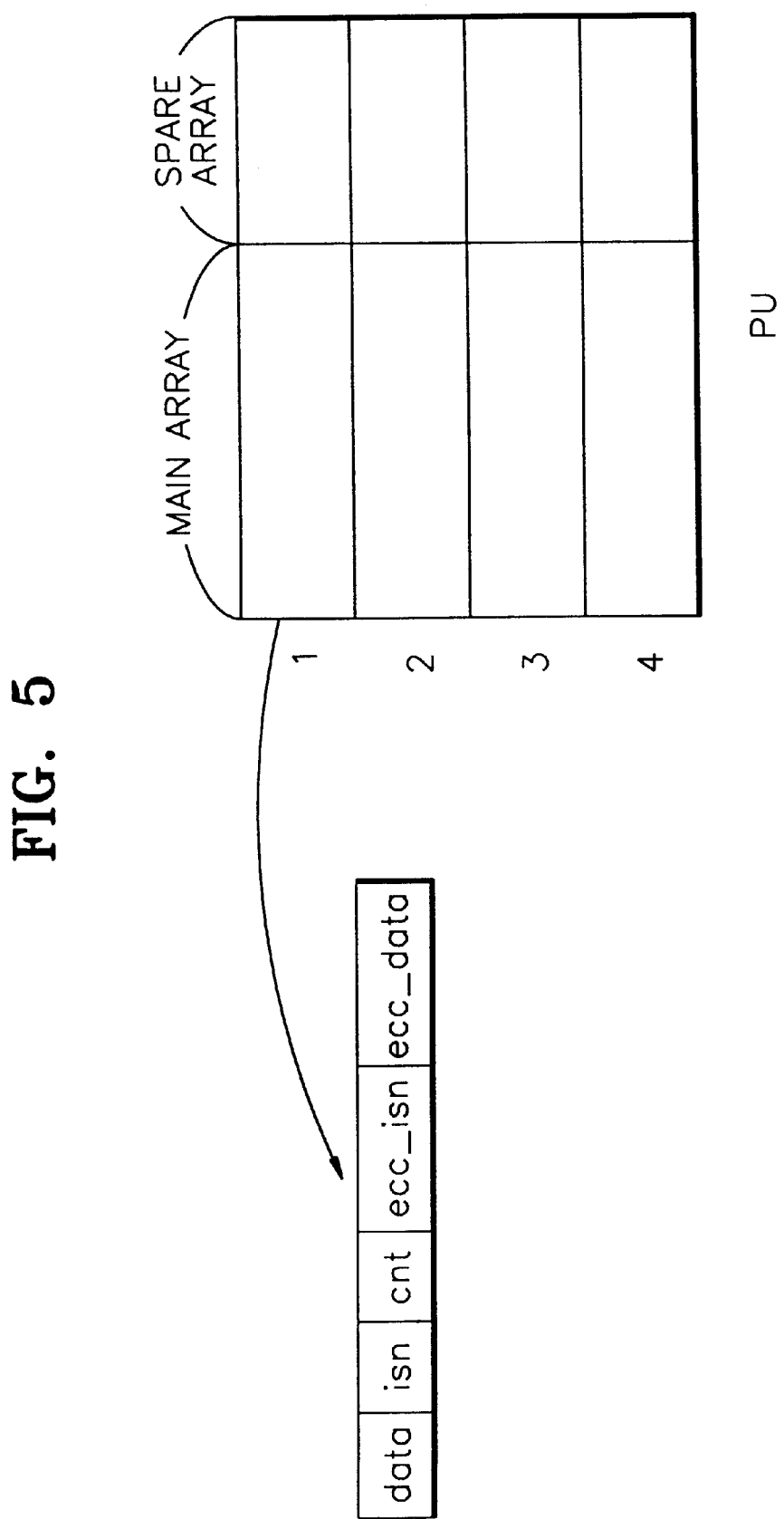
FIG. 5 shows a format of a physical unit (PU) of a NAND-type flash memory.

As shown in FIG. 5, a block in a PU for a NAND-type flash memory is composed of a main array and a spare array. Actual data is written in the main array. Information such as a logical sector number lsn, a wrap count cnt, an error correction code for the cnt and lsn ecc_lsn, and an error correction code for data ecc_data are written in the spare array. In this case, the block is also called a page.

A "block" commonly used in the data sheet of a NAND-type flash memory is a PU capable of erasure at one time. This block may be the same as the "unit" mentioned in this embodiment. However, in actual implementation, the unit may be composed of a plurality of blocks.

First, a LUN and a PUN of a unit belonging to a corresponding block are determined using mapping information. A check is made as to the status of the corresponding block in the BMA of the determined PUN. If the status of the block is 'free' (1111), the status of the block is indicated as 's0' (1110). Then, information such as data and the logical sector number lsn is written to the block. The block in a 'free' state also has a invalid logical sector number lsn.

If the status of the corresponding block is 'valid', the corresponding PU is searched for a block, the status of which is 'free' (1111), according to a typical mapping technique. Then, the status of the found block is changed the status following the status of the previous block. For example, if the status of the previous block is designated 's0' (1110), the status of a new block is changed into 's1' (1100). A block search is made in the same manner as the conventional remapping driving method. Then, new data and a new logical sector number lsn are written to the new block, the status of which is set to 's1' (1100). The status of the previous block is changed to 'deleted' (0000).

If the status of the corresponding block is 's1' (1100) and a block set to 'free' (1111) exists in the corresponding unit, the status of the block in a 'free' state is set to 's2' (1000). Then, information such as data and a logical sector number lsn is written to the corresponding block, the status of which is set to 's2'. The status of the previous block is changed to 'deleted' (0000).

If the status of the corresponding block is 's1' (1000), and a block set to 'free' (1111) exists in the corresponding unit, the status of the block in a 'free' state is set to 's0' (1110). Then, data and a logical sector number lsn are written to the corresponding block, the status of which is set to 's0'. The status of the previous block is changed into 'deleted' (0000).

The status change of each block indicated with arrows shown in FIG. 4 will be fully explained.

If write and rewrite for each block are performed in this way, data can be written to one block by performing a partial write operation three times (prof). If a block is in a 'deleted' state, assuming that data other than status information such as data and a logical sector number lsn is all valid, data can be actually written by performing a partial write operation twice. If a system failure occurs due to a power failure or other reasons in 401 through 407, a recovery operation is performed, during which the status of a block, to which data is written, is set to 'deleted'. During the remaining process, in the case of the above system failure such as a power failure, it is not necessary to perform any particular recovery operation.

That is, if a failure occurs when data is being written to a particular block, a recovery operation does not need to be performed on a 'free' or 'deleted' block. This is the case if only one block is valid relative to one logical block number.

A recovery operation is required if two valid blocks having the same logical block number exist. According to the conventional art, if two valid blocks having the same logical block number exist, it is impossible to distinguish a previous block from a new block, which makes it difficult to determine which block will be erased during a recovery operation. On the other hand, in the case of using a wrap-count, it is possible to distinguish between a previous block and a new block, which makes it easy to determine which block will be erased. Whether a new block or a previous block will be erased during a recovery operation may be determined depending on the type of application.

That is, if a system failure occurs when writing block data, a check is made as to whether two valid blocks having the same logical block number exists. If only one block having 'valid' status exists, a recovery operation is not needed, and a write operation is stopped. However, if two blocks in a 'valid' state exist, a previous block and a new block are differentiated based on a wrap count allocated to each block. Then, either a previous block or a new block is deleted. FIG. 4 is an example in which a new block is deleted. However, a previous block may be deleted as required.

Figures 6, 7:
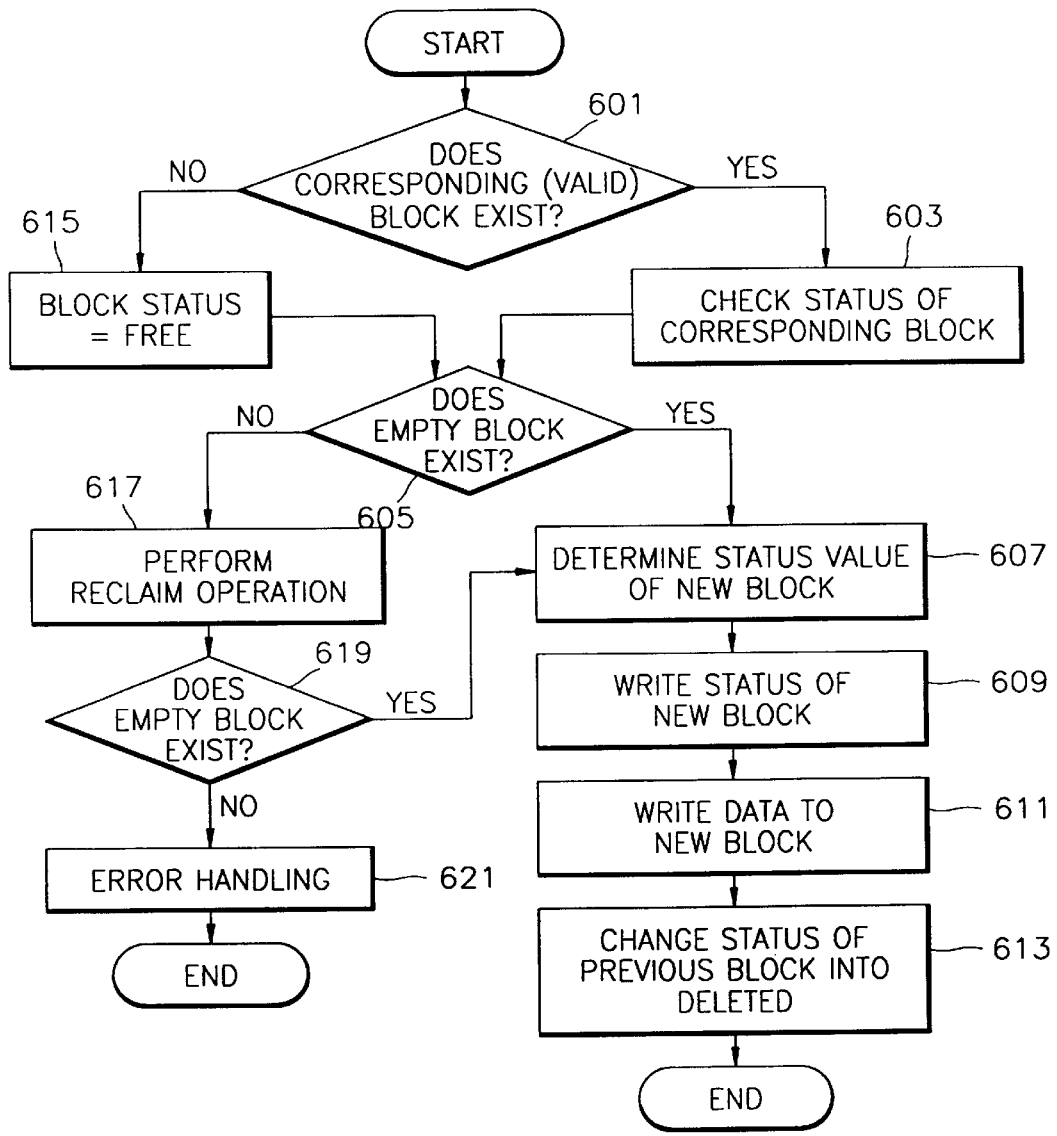
FIG. 6 shows a flowchart of a process of writing a block by a remapping driving method for a flash memory according to the present invention.
FIG. 7 shows a format of an erase unit of a flash memory according to the present invention.

FIG. 6 is a flowchart of a block write/rewrite operation according to the remapping driving method according to the present invention.

In step 601, a check is made as to whether a corresponding block exists in a corresponding unit. If the corresponding block exists, a check is made as to whether the corresponding block is in a 'valid' state. If the block is valid, the status of the corresponding block is checked in step 603. Then, in step 605, a check is made as to whether an empty block exists in the corresponding unit. The check is made in such a way to search the corresponding unit for a block that is set as 'free'. If an empty block exists in the corresponding unit, the status value of the new block is determined in step 607.

The status value of the new block is determined depending on the status value of the corresponding block checked in the step 603. As described above with reference to FIG.

4, if the status of the previous block is set to 's0', the status value of the new block is set to 's1'. If the status of the previous block is set to 's1' the status value of the new block is set to 's2', and if the status of the previous block is set to 's2', the status value of the new block is set to 's0'. If the status of the previous block is set to 'free', the status value of the new block is set to 's0'.

Then, in step 609, the status value of the new block determined in step 607 is written to the empty block found in step 605. In step 611, data corresponding to the new block, the status value of which has been written, is written to the new block. In step 613, the status of the previous block is changed to "deleted" and the process is terminated. In this case, the previous block is the block whose status was checked in step 603.

Meanwhile, if the corresponding block does not exist or it is indicated as other than valid (that is, the status of the corresponding block is 'deleted'), as a result of the check made in the step 601, in step 615, the corresponding block is designated 'free'. In this case, if the corresponding block does not exist, an area for the corresponding block is allocated and the status of the corresponding block is designated 'free'. Then, if an empty block exists in the corresponding unit as a result of the check made in the step 605, the status value of a new empty block is determined as described in the step 607. Conversely, if an empty block does not exist, a reclaim operation is performed in step 617. The reclaim operation will be described later with reference to FIGS. 7–9.

After having performed the reclaim operation, a check is made as to whether an empty block exists in the corresponding unit in step 619. If the empty block exists in the corresponding unit as a result of the check, the process flow returns to step 607 to determine the status value of the new block. However, if an empty block does not exist, error handling is performed and the process is terminated in step 621.

To read data from a particular block, first, the corresponding LUN and PUN are determined using mapping information. Then, the physical location of the particular block is determined through the BAM for a corresponding unit and then data is read therefrom. Data can be read only when the block is valid. Thus, if a valid block does not exist, this means that the block in the corresponding unit has never been written to or is deleted to be unusable. The block is set to initial value 0xFF. A block search is made in the same manner as in the conventional remapping driving method.

Meanwhile, in the case of a unit having a number of deleted blocks, a reclaim operation is performed. Also in this case, the status of the unit needs to be changed. FIG. 7 is an example of a format of an erase unit for a flash memory according to the present invention. Referring to FIG. 7, the physical unit number of a previous unit xpun, a wear level of a reclaimed (previous) unit xcnt, a logical unit number lun, a valid flag v, a bad block table bb tbl, a wear level cnt, copying/transferring cp/xf, and data are written to the erase unit.

The status change of a unit is limited depending on the number of partial write operations. A wrap-count technique as for a block may be applicable to the unit. However, status information may be appropriately distributed over each block while writing the EUH to a plurality of blocks.

Figure 8:
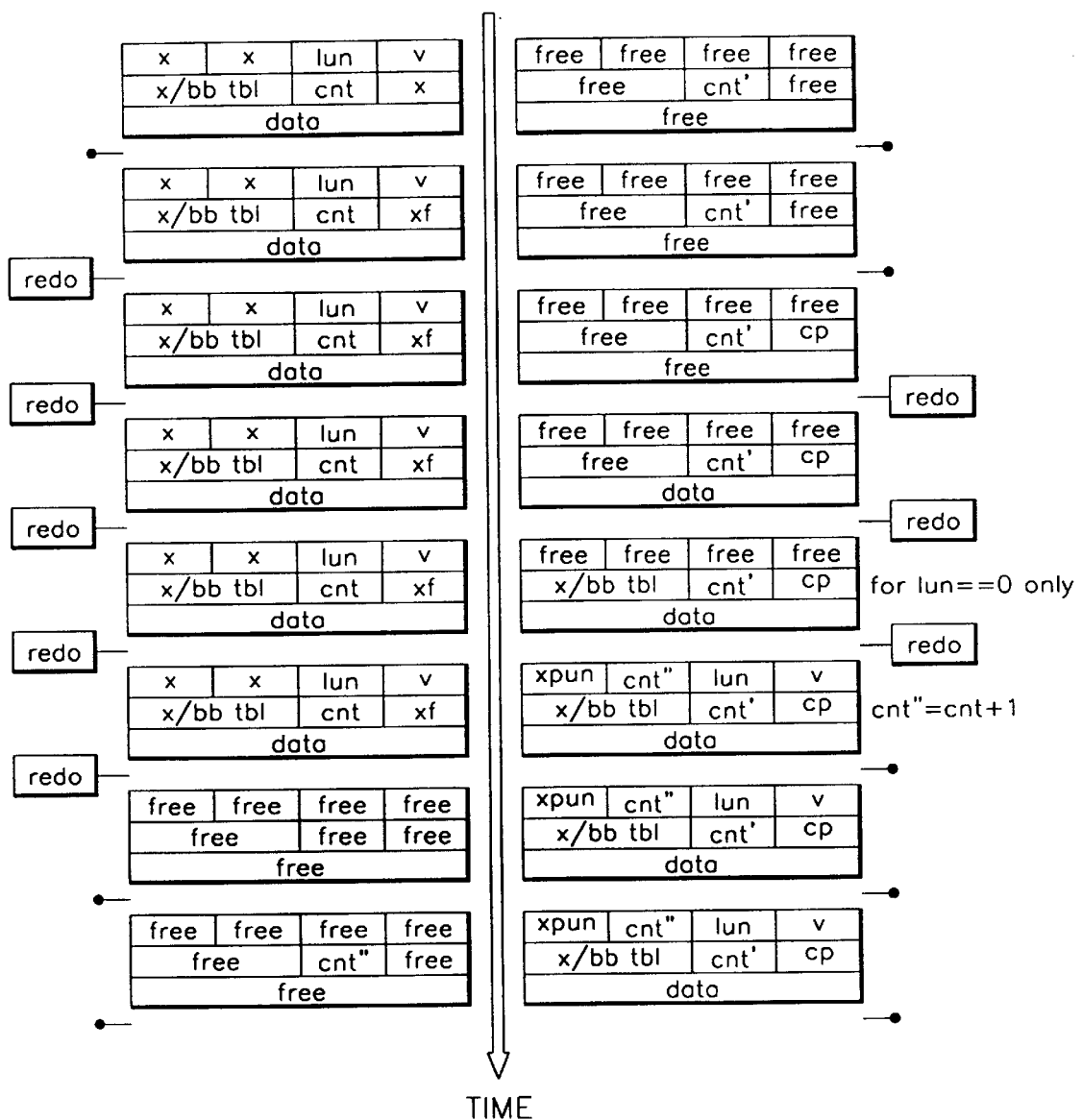
FIG. 8 shows an example of the relationship between units for explaining a process of performing a reclaim operation by a remapping driving method for a flash memory according to the present invention.

For example, if the status of the unit is classified into free, valid, being copied, and being transferred, the EUH is written over two blocks as shown in FIG. 8. 'Free' and 'valid' are written to a first block, while 'being copied' and 'being transferred' are written to a second block. In this case, even if the unit is 'free', a counter for the wear-level must be written.

A free erase unit is free and normal units other than the free erase unit are valid. The unit that copies data from reclaimed blocks, which was formerly the erase unit, is indicated as being copied 'cp'. Before performing a reclaim operation, the status of the previous unit is indicated as being transferred 'xf'. Valid blocks are copied from the unit being transferred to the unit being copied, and then a wear level cnt" and a logical block number lun of the unit being transferred are copied. The status of the unit being copied is indicated as valid v. Then, the unit being transferred is deleted. A wear level cnt" equal to the wear level cnt copied to the new unit plus 1 is written to the headers of the new and previous units, respectively. If a failure occurs during the reclaim operation, the operation is initiated at portions indicated as redo in FIG. 8 and then a recovery process is appropriately performed. That is, in the case of 'being transferred' and 'being copied', which are temporary statuses during the reclaim operation, the operation is redone. However, no recovery operation is performed at portions other than those indicated as 'redo'.

A recovery method for a failure during the reclaim operation is similar to that for a failure during the block write/rewrite operation. That is, a reclaim operation is appropriately performed again according to the processes of the operation being performed. For example, if two units having the same LUN exist, one of which is being copied and the other is being transferred, the unit being copied is deleted. If the wear level of the previous unit (the unit being copied) is not yet written to the unit being transferred, the wear level for the unit being transferred, which has been written to the previous unit (the unit being copied), is copied to the unit being transferred, and then the next step is performed.

The status of the erase unit may be indicated by changing various values at the fixed location like in the conventional remapping driving method. Alternatively, the unit header may be written to a plurality of blocks in the corresponding unit, a different location may be designated for each status of the unit, and the value of location divided into 0 and 1 so as to determine whether the status value is allocated.

For example, information such as a logical unit number lun, validity of a unit status, and a wear level of a previous block may be written to a first block, information such as the status of copying/transferring cp/xf, and a wear level may be written to a second block. Under this condition, it is possible to perform a reclaim operation according to the sequence shown in FIG. 8 by three partial write operations. If the status information is distributed over more blocks, or the arrangement of the status information is appropriately adjusted, it is possible to farther reduce the number of partial write operations.

Figure 9:
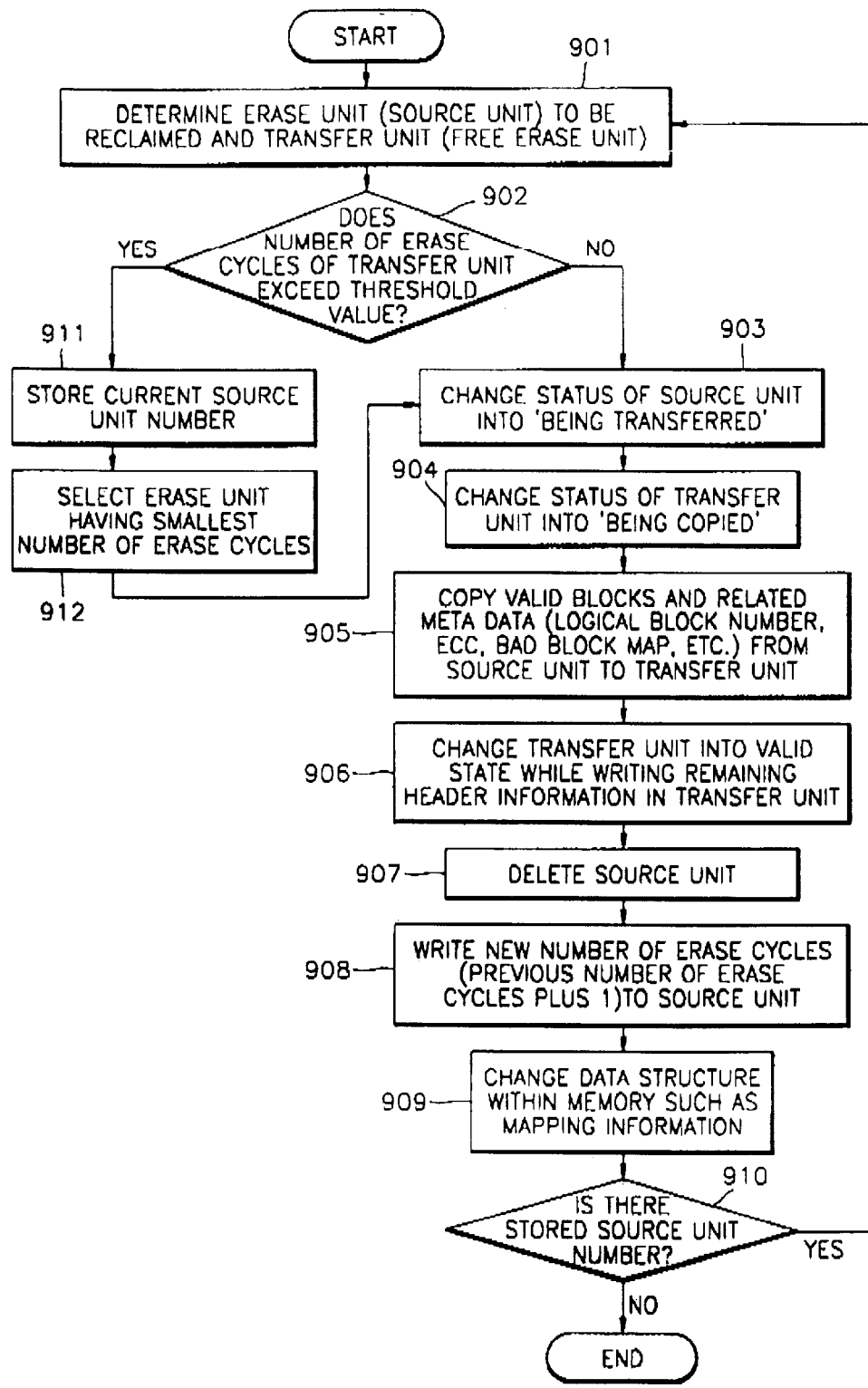
FIG. 9 shows a flowchart of a process of a reclaim operation in the remapping driving method for a flash memory according to the present invention.

FIG. 9 is a flowchart of a process of reclaiming a block by a remapping driving method according to the present invention. In step 901, an erase unit (source unit) to be reclaimed and a transfer unit (free erase unit) are determined. In step 902, a check is made as to whether the number of erase cycles for the transfer unit exceeds a threshold value. The threshold value may be set to 3 based on the above description. If the number of erase cycles is not greater than the threshold value 3, the status of the source unit is changed to 'being transferred in step 903, while the status of the transfer unit is changed to 'being copied' in step 904.

Then, valid blocks and related meta data such as LBN, ECC, and a bad block map are copied from the source unit to the transfer unit. Then, in step 906, the remaining header information in the transfer unit, such as PUN, the number of erase cycles, and LUN, is written and then the status of the transfer unit is changed to valid. In step 907, the source unit is deleted, and a new number of erase cycles is written to the source unit. The new number of erase cycles is the value equal to the previous number of erase cycles plus 1. In step 909, the structure of data such as mapping information within a memory is changed. In this case, this change is made due to updates. Then, in step 910, a check is made as to whether a source unit number is stored. If the stored source unit number exists, the process flow returns to step 901. However, if the stored source unit number does not exist, the process is terminated.

Meanwhile, if the number of erase cycles of the transfer unit exceeds the threshold value as a result of the check made in the step 902, a current source unit number is stored in step 911. This is because it is not suitable to transfer data of the source unit to this corresponding transfer unit. Thus, the current source number is reserved to be used when a reclaim operation is performed using a selected source unit (erase unit) and then the source unit that was not formerly reclaimed is reclaimed using a changed transfer unit in step 912. That is, an erase unit having the smallest number of erase cycles is selected in step 912 and then the process flow returns to step 903, thereby performing a reclaim operation as described above.

As described in the foregoing, the present invention is advantageous in managing the write status of a block or unit in a flash memory such as a NAND-type flash memory, in which the number of partial write cycles is limited, by set status information using a wrap-count. For example, the status of the block or unit is changed by a process such as free (1111) valid (s0(1110) s1 (1100) s2(1000) s0(1110) . . . ) deleted (0000). Thus, if this process is applied to a NAND-type flash memory, data can be written by performing a partial write operation three times. If the particular block is deleted, assuming that data other than actual data and status information such as the LBN number is all valid, data can be actually written by two partial write operations.

In the case of the erase unit, if information such as a corresponding LUN and validity of the status, and the wear level (the number of erase cycles) of the previous unit are written to a first block, and information about copying/transferring and a wear level are written to a second block, it is possible to perform a reclaim operation by three partial program operations. If the status information is distributed over more blocks or the arrangement of the status information is appropriately adjusted, the number of partial program cycles can be further reduced.

What is claimed is:

1. A method of driving remapping in a flash memory which is partitioned into a plurality of units, each unit having one or more blocks, the method comprising:
    searching for a predetermined physical unit based on mapping information about a predetermined block;
    searching the found physical unit for another block, the status of which is free, if the predetermined block exists in a valid state in the physical unit;
    establishing a cyclical order of block statuses;
    changing the status of the other block to a status next to the status of the predetermined block; and
    writing new data and additional information including a logical block number to the other block;
    changing the status of the predetermined block to a deleted state.

2. The method of claim 1, wherein changing the status of the other block comprises setting the status of the other block depending on the status of the predetermined block, which is set to one of four possible statuses.

3. The method of claim 2, wherein changing the status of the other block comprises:
    setting the status of the other block to a first valid state if the predetermined block is in a free state;
    setting the status of the other block to a second valid state if the predetermined block is in the first valid state;
    setting the status of the other block to a third valid state if the predetermined block is in the second valid state; and
    setting the status of the other block to the first valid state if the predetermined block is in the third valid state.

4. The method of claim 1, further comprising, when the predetermined block does not exist or exists in a deleted state, setting the status of the predetermined block to free and searching for another block, the status of which is free.

5. The method of claim 4, further comprising:
    performing a reclaim operation on the physical unit when the other block does not exist;
    searching for another block, the status of which is free;
    returning to changing the status of the other block when the other block is found; and
    error processing when the other block is not found.

6. The method of claim 5, wherein performing a reclaim operation comprises:
    determining a source unit to be reclaimed and a transfer unit;
    setting the statuses of the source unit and the transfer unit to being transferred and being copied, respectively;
    copying valid blocks and related meta information and header information within the source unit;
    setting the transfer unit, the status of which has been set as being copied, to a valid state, while increasing the number of erase cycles (wear level) of the source unit; and
    deleting the source unit while writing the number of erase cycles to the source unit.

7. The method of claim 6, wherein performing a reclaim operation further comprises;
    checking whether the number of erase cycles exceeds a threshold value;
    returning to setting the statuses of the source unit and the transfer unit if the number of erase cycles does not exceed the threshold value;
    storing a source unit number of the source unit if the number of erase cycles exceeds the threshold value; and
    selecting a source unit having the smallest number of erase cycles and then returning to setting the statuses of the source unit and the transfer unit.

8. The method of claim 6, wherein performing a reclaim operation further comprises:
    updating the structure of internal data including mapping information about the flash memory after deleting the source unit and writing the number of erase cycles;
    checking whether a source unit to be reclaimed further exists; and
    returning to determining a source unit if the source unit to be reclaimed further exists.

9. The method of claim 6, wherein performing a reclaim operation further comprises;

checking whether two units having the same logical unit number exist in the case of a failure; and if two units having the same logical unit number exist, one of which is being transferred and the other is being copied, deleting the unit being copied and writing the number of erase cycles to the unit being copied.

10. The method of claim 9, wherein performing a reclaim operation further comprises copying the number of erase cycles for the unit being transferred, which is written to the unit being copied, to the unit being transferred, when the number of erase cycles is not written to the unit, the status of which is set to being transferred, in the case of the failure, and then terminating the reclaim operation.

11. The method of claim 1, further comprising:

checking whether two valid blocks having the same logical block number exist in the case of a failure;

terminating the process of writing the status of a block if only one valid block exists;

checking the statuses of the two blocks and distinguishing between the predetermined block (previous block) and a next block (new block) if the two valid blocks exist; and deleting either the predetermined block or the next block, depending on the data being recovered.

12. A flash memory which is partitioned into a plurality of units, each unit having one or more blocks, wherein a first block of the unit is allocated so as to write information including a logical unit number, validity of a status, and the number of erase cycles for a previous block, a second block of the unit is allocated so as to write information including the status of being copied/transferred and the number of erase cycles (wear level), and information indicating the status of a block determined based on a wrap-count is written on a predetermined area of a spare array in a block, to which data of the unit is written.

\* \* \* \* \*